US009275459B2

(12) United States Patent
Goma et al.

(10) Patent No.: US 9,275,459 B2
(45) Date of Patent: Mar. 1, 2016

(54) METHOD AND APPARATUS FOR CALIBRATING AN IMAGING DEVICE

(71) Applicant: QUALCOMM Incorporated, San Diego, CA (US)

(72) Inventors: Sergiu R Goma, San Diego, CA (US); Kalin Mitkov Atanassov, San Diego, CA (US); Vikas Ramachandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 13/645,975

(22) Filed: Oct. 5, 2012

(65) Prior Publication Data
US 2014/0098194 A1 Apr. 10, 2014

(51) Int. Cl.
H04N 13/02 (2006.01)
G06T 7/00 (2006.01)
H04N 5/232 (2006.01)

(52) U.S. Cl.
CPC ............ *G06T 7/002* (2013.01); *H04N 5/23212* (2013.01); *H04N 13/025* (2013.01); *H04N 13/0246* (2013.01); *G06T 2207/10012* (2013.01)

(58) Field of Classification Search
CPC ..................... G06T 2207/10012; G06T 7/002; H04N 13/0246; H04N 13/025; H04N 5/23212
USPC .......................................................... 348/47
See application file for complete search history.

(56) References Cited

U.S. PATENT DOCUMENTS

| 6,943,792 B2 | 9/2005 | Sakakibara |
| 7,020,319 B2 | 3/2006 | Mertelmeier et al. |
| 7,711,181 B2 | 5/2010 | Kee et al. |
| 2005/0280709 A1* | 12/2005 | Katayama ...................... 348/187 |
| 2010/0245541 A1* | 9/2010 | Zhao ........................ G01D 1/00 348/45 |
| 2010/0271511 A1 | 10/2010 | Ma et al. |
| 2012/0162379 A1* | 6/2012 | Dahi et al. ...................... 348/47 |

FOREIGN PATENT DOCUMENTS

EP 2259599 A1 12/2010
JP 2012023561 A 2/2012

OTHER PUBLICATIONS

Ran L., et al., "Stereo Cameras Self-Calibration Based on SIFT", Measuring Technology and Mechatronics Automation, 2009, ICMTMA '09, International Conference on, IEEE, Piscataway, NJ, USA, Apr. 11, 2009, pp. 352-355, XP031511233, DOI: 10.1109/ICMTMA.2009.338, ISBN: 978-0-7695-3583-8.
Atanassov K., et al., "Unassisted 3D camera calibration", Proceedings of SPIE, vol. 8288, Feb. 6, 2012, pp. 828808-828808-9, XP055091061, ISSN: 0277-786X, DOI: 10.1117/12.909616.
International Search Report and Written Opinion—PCT/US2013/062918—ISA/EPO—Dec. 16, 2013.

* cited by examiner

*Primary Examiner* — Mohammed Rahaman
(74) *Attorney, Agent, or Firm* — Knobbe Martens Olson & Bear LLP

(57) ABSTRACT

Described are methods and apparatus for adjusting images of a stereoscopic image pair. The methods and apparatus may capture a first and second image with first and second imaging sensors. The two imaging sensors have intrinsic and extrinsic parameters. A normalized focal distance of a reference imaging sensor may also be determined based on intrinsic and extrinsic parameters. A calibration matrix is then adjusted based on the normalized focal distance. The calibration matrix may be applied to an image captured by an image sensor.

24 Claims, 6 Drawing Sheets

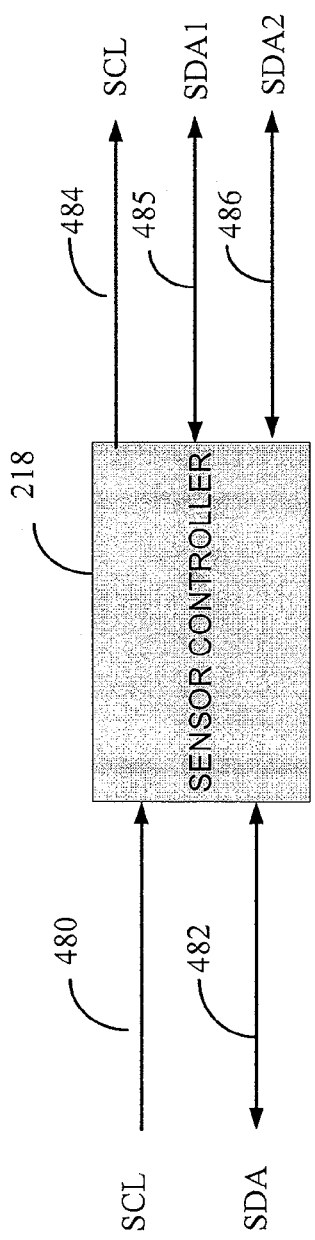
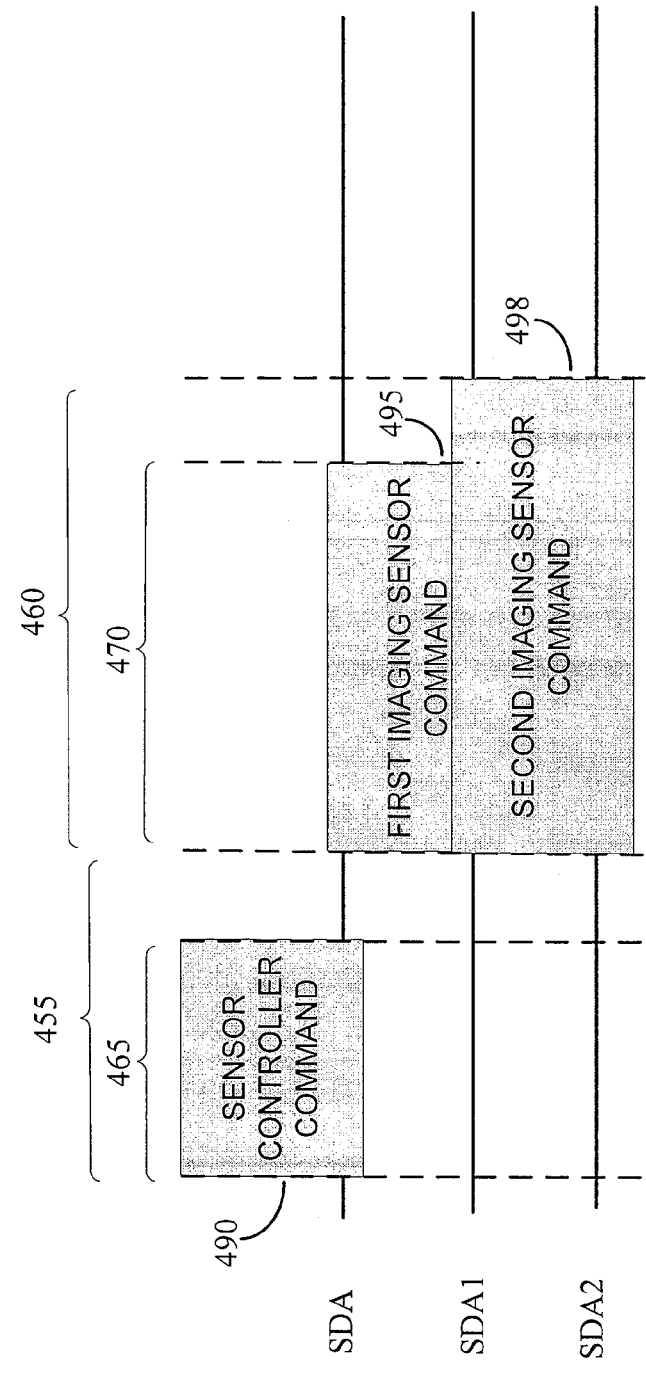

METHOD AND APPARATUS FOR CALIBRATING AN IMAGING DEVICE

TECHNICAL FIELD

The present embodiments relate to imaging devices, and in particular, to methods and apparatus for the calibration of imaging devices including more than one imaging sensor.

BACKGROUND

In the past decade, digital imaging capabilities have been integrated into a wide range of devices, including digital cameras and mobile phones. Recently, the ability to capture stereoscopic images with these devices has become technically possible. Device manufacturers have responded by introducing devices integrating multiple digital imaging sensors. A wide range of electronic devices, including mobile wireless communication devices, personal digital assistants (PDAs), personal music systems, digital cameras, digital recording devices, video conferencing systems, and the like, make use of multiple imaging sensors to provide a variety of capabilities and features to their users. These include not only stereoscopic (3D) imaging applications such as 3D photos and videos or movies, but also higher dynamic range imaging and panoramic imaging.

Devices including this capability may include multiple imaging sensors. For example, some products integrate two imaging sensors within a digital imaging device. These sensors may be aligned along a horizontal axis when a stereoscopic image is captured. Each camera may capture an image of a scene based on not only the position of the digital imaging device but also on the imaging sensors physical location and orientation on the camera. Since some implementations provide two sensors that may be offset horizontally, the images captured by each sensor may also reflect the difference in horizontal orientation between the two sensors. This difference in horizontal orientation between the two images captured by the sensors provides parallax between the two images. When a stereoscopic image pair comprised of the two images is viewed by a user, the human brain perceives depth within the image based on the parallax between the two images.

In some environments, the primary use of an imaging device including multiple imaging sensors may still be to capture traditional two dimensional snapshots and movies. In these environments, use of the dual imaging sensors for stereoscopic images and movies may be considered a convenience feature that is less frequently used. For these users, an imaging device may be designed that provides one imaging sensor with a relatively high resolution. This first imaging sensor may be employed to capture two dimensional snapshots and movies. Since two dimensional images can be captured using only one imaging sensor, high quality two dimensional images using the one relatively high resolution sensor may be provided. The imaging device may also include a second imaging sensor, which captures images at a lower resolution than the first imaging sensor. This second imaging sensor may be used in conjunction with the first imaging sensor to capture image pairs for stereoscopic snapshots and movies. Since these stereoscopic image pairs include two images captured at different resolutions, additional image processing within the imaging device may compensate for the differences between the images captured by the two imaging sensors to provide the user with a satisfactory stereoscopic snapshot or movie.

Using two imaging sensors with different resolutions may reduce the cost of the imaging device when compared to an imaging device designed with two high resolution sensors. The cost reduction may be attributed not only to the lower cost of the second, lower resolution imaging sensor, but also to lower cost supporting electronics for the lower resolution sensor including, for example, power circuitry and image processing circuitry.

When imaging sensors with differing resolutions are utilized to capture a stereoscopic image pair, image processing methods employed by the imaging device may compensate for asymmetric sensor resolutions along with other differences that may exist between the two imaging sensors. For example, these methods may compensate for differences in the sensor geometry, brightness, and color response. Additionally, compensating for differences in the electronic timing and synchronization of the disparate sensors may also be necessary. Camera calibration methods may also be adapted to better calibrate the disparate imaging sensors.

SUMMARY

Some of the present embodiments may include a method of calibrating a stereoscopic imaging device. The method includes capturing a first image of a scene of interest with a first image sensor having a first resolution, a first set of intrinsic parameters, and a first set of extrinsic parameters, capturing a second image of the scene of interest with a second image sensor having a second resolution different from the first resolution, a second set of intrinsic parameters, and a second set of extrinsic parameters, wherein the first image and second image comprise a stereoscopic image pair, determining a normalized focal distance of a reference imaging sensor, based, at least in part, on the intrinsic and extrinsic parameters, adjusting a calibration matrix based on the normalized focal distance, and adjusting a non-reference image based on the calibration matrix. In some embodiments, the intrinsic parameters include a resolution and field of view. In some embodiments the extrinsic parameters include camera pose parameters. In some of these embodiments, the camera pose parameters include yaw, pitch, and roll offsets between the first imaging sensor and the second imaging sensor. In some embodiments, the reference imaging sensor is the first imaging sensor and the non-reference image is the second image.

Another aspect disclosed is an apparatus for capturing a stereoscopic image pair. The apparatus includes a first imaging sensor with a first resolution, a first intrinsic parameter, and a first extrinsic parameter, a second imaging sensor, with a second resolution different than the first resolution, a second intrinsic parameter and a second extrinsic parameter, a sensor controller, operatively coupled to the first imaging sensor and the second imaging sensor, a processor, a memory, operatively coupled to the processor, and storing: a sensor control module, configured to capture a first image of a scene of interest with a first image sensor, and to capture a second image of the scene of interest with a second image sensor, wherein the first image and second image comprise a stereoscopic image pair, a focal distance determination module, configured to determine a normalized focal distance of a reference imaging sensor, based, at least in part, on the intrinsic and extrinsic parameters, a calibration matrix adjustment module, configured to adjust a calibration matrix based on the normalized focal distance, and a projective correction module, configured to adjust a non-reference image based on the calibration matrix.

In some embodiments, the intrinsic parameters include a resolution and field of view. In some embodiments, the extrinsic parameters include camera pose parameters. In some embodiments, the camera pose parameters include yaw, pitch, and roll offsets between the first imaging sensor and the second imaging sensor.

Another aspect disclosed is an apparatus for capturing a stereoscopic image pair. The apparatus includes means for capturing a first image of a scene of interest with a first image sensor, the first image sensor including a first resolution, a first intrinsic parameter and a first extrinsic parameter, means for capturing a second image of the scene of interest with a second image sensor, the second image sensor having a second resolution, a second intrinsic parameter, and a second extrinsic parameter, the wherein the first image and second image comprise a stereoscopic image pair, means for determining a normalized focal distance of a reference imaging sensor, based, at least in part, on the intrinsic and extrinsic parameters, means for adjusting a calibration matrix based on the normalized focal distance, and means for adjusting a non-reference image based on the calibration matrix.

Another aspect disclosed is a non-transitory computer readable medium storing processor instructions that when executed cause a processor to perform the method of capturing a first image of a scene of interest with a first image sensor, the first image sensor having a first resolution, a first intrinsic parameter, and a first extrinsic parameter, capturing a second image of the scene of interest with a second image sensor, the second image sensor having a second resolution, a second intrinsic parameter, and a second extrinsic parameter, where the first image and second image comprise a stereoscopic image pair, determining a normalized focal distance of a reference imaging sensor, based, at least in part, on the intrinsic and extrinsic parameters, adjusting a calibration matrix based on the normalized focal distance, and adjusting a non-reference image based on the calibration matrix. In some embodiments, the intrinsic parameters include a resolution and field of view. In some embodiments, the extrinsic parameters include camera pose parameters. In some embodiments, the camera pose parameters include yaw, pitch, and roll offsets between the first imaging sensor and the second imaging sensor.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4B is a block diagram of a sensor controller.

FIG. 4C is a timing diagram illustrating the sending of two commands to asymmetric imaging sensors using an embodiment of the disclosed I2C router.

DETAILED DESCRIPTION

Figure 1:
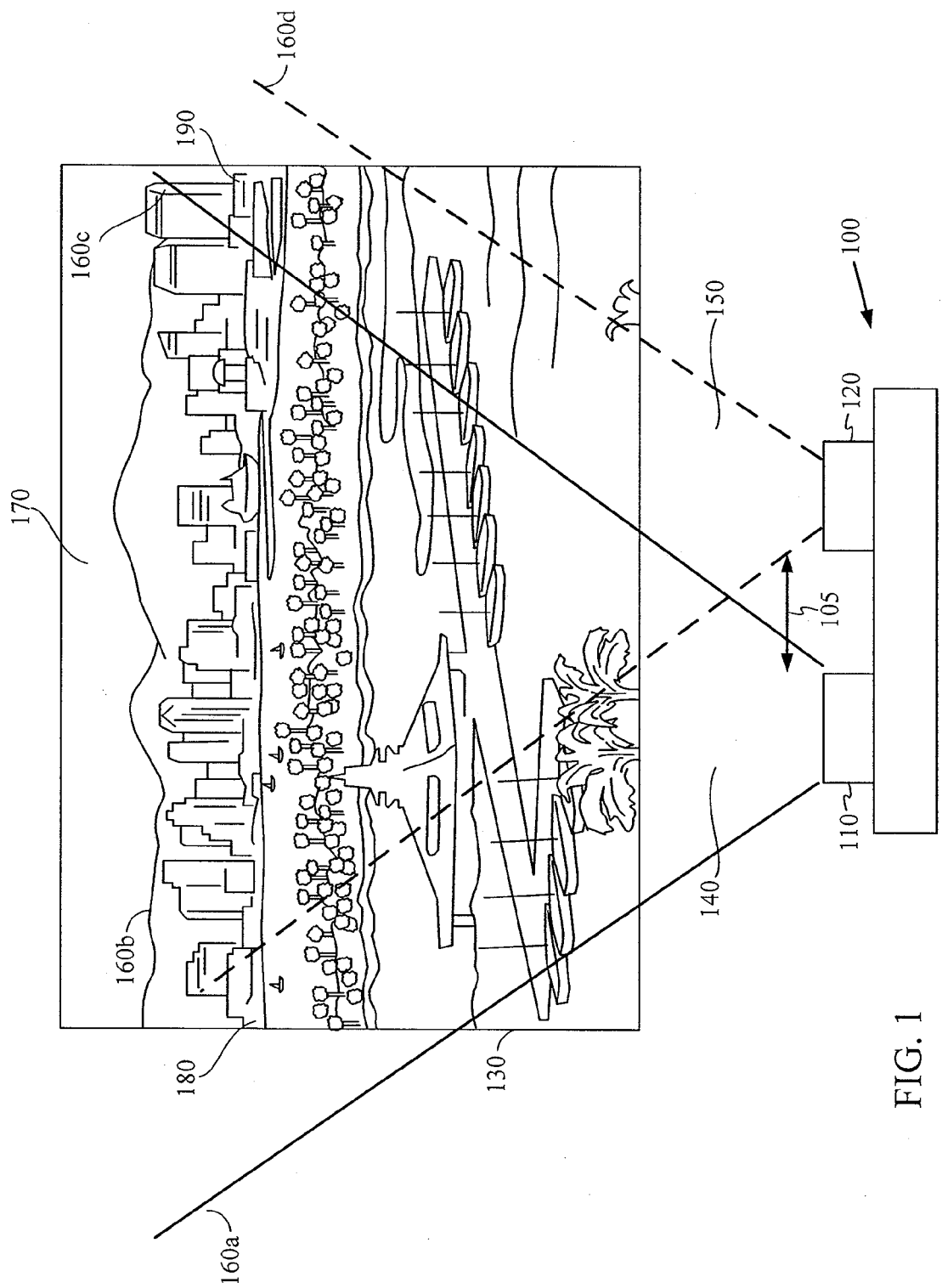
FIG. 1 is a block diagram showing one aspect of an imaging environment including a stereoscopic imaging device that includes two imaging sensors.

Embodiments of the invention relate to methods and systems that include two different size, or different resolution, image sensors that are used to capture stereoscopic image pairs. In order to provide a user with a good quality stereoscopic image, the system adjusts for the two different image sensors, as described below. For example, in one embodiment, the system may include a first sensor with a relatively low number of megapixels and a second sensor with a relatively high number of megapixels. In addition, in one embodiment, the system may include a first sensor that captures images at a relatively low resolution, and a second sensor that captures images at a relatively high resolution. As used below, these two different sensors are referred to as "asymmetric imaging sensors."

Compensation for differences between asymmetric imaging sensors in an imaging device may be performed by image processing methods described below. In some implementations, these image processing methods may be performed by the imaging device itself. For example, in one embodiment the viewing geometry of images captured by a pair of asymmetric sensors is adjusted so that the resolution, field of view, and focal distance are equivalent between images captured by the asymmetric imaging sensors.

To achieve a substantially equal resolution between images captured by the asymmetric imaging sensors, some implementations may combine pixel data in a first image from a first higher resolution imaging sensor to reduce the resolution of the first image data. After the data in the first image is combined, the resolution of the first image may be substantially equal to the resolution of a second image captured by a lower resolution imaging sensor.

In an example implementation that produces a first image with four times greater resolution than a second image captured by a second, lower resolution image sensor, pixel values captured by the first imaging sensor may be combined using a 2×2 binning process. In this process, four (4) pixels from the first high resolution sensor may be combined into a single larger pixel, reducing the overall number of pixels in the image data produced by the first imaging sensor. By aggregating, or binning, the image data produced by the higher resolution image sensor, the resolution of images captured by the first imaging sensor may be adjusted to be substantially equivalent to the resolution of images produced by the second, lower resolution imaging sensor.

In addition to binning the image data, some other implementations may crop a first higher resolution image produced by a higher resolution first imaging sensor such that the first image data has an equivalent resolution to second image data produced by a lower resolution second imaging sensor. Cropping of the first image in this manner may also change the field of view of the first image.

In an alternate embodiment, some other implementations may up-sample the smaller resolution image to adjust its resolution to be substantially equivalent to the higher resolution image. Some embodiments may instead subsample the higher resolution image to adjust its resolution to be substantially equivalent to the lower resolution image.

After the cropping or binning process has been completed, the resolution of the images produced by the first higher resolution imaging sensor and the second lower resolution imaging sensor may be substantially equivalent. However, the field of view shown by the two images may still be different. The field of view may be different as a result of the cropping and/or binning, or may be different due to variations in the field of view of the asymmetric imaging sensors themselves.

For example, if the asymmetric imaging sensors include lenses with different curvatures, the field of view captured by the two asymmetric imaging sensors may be different. The field of view of the images may be made equivalent using a variety of methods that may vary by implementation. For example, some implementations may crop the image with the larger field of view to make the field of view of the two images equivalent.

Some implementations may utilize a calibration process to equalize the field of view and focal distance of two images captured by asymmetric imaging sensors. The calibration process may be applied to and also be based on images captured by the asymmetric imaging sensor pairs. The calibration process may produce a calibration matrix that can be applied to images captured by the asymmetric imaging sensors. After application of the calibration matrix to an image pair, the geometry of the image pair may be substantially equalized. The pose of the images may be equalized, as the images of the image pair may be made parallel to each other.

The calibration process may first determine both intrinsic and extrinsic parameters of the imaging sensors. Intrinsic parameters may include the field of view of each imaging sensor and the resolution of each imaging sensor. Extrinsic parameters determined may include camera pose parameters. For example, parameters defining the rotations of the first and second imaging sensors about an X, Y, and Z axis may be determined. Relative shifts between the imaging sensors may also be determined. For example, the image sensors may also be shifted along the X, Y, or Z axis with respect to each other. Image processing methods may detect these shifts based on the images captured by the imaging sensors.

Once the intrinsic and extrinsic parameters are known, a normalized focal distance of one of the imaging sensors may be determined. The imaging sensor for which the normalized focal distance is estimated may be considered a reference imaging sensor in some implementations. For example, in some implementations, the focal distance of the first imaging sensor may be estimated. In other implementations, the focal distance of the second imaging sensor may be estimated. To estimate the focal distance, three dimensional coordinates of keypoints may be compared to the coordinates of each keypoint in its two dimensional image. The 3d and 2d coordinates may then be related by a 3×4 matrix. This matrix encapsulates the focal length. Once the normalized focal distance is determined, a calibration matrix may be adjusted. The calibration matrix can then be applied to a non-reference image, resulting in the focal distance of the non-reference image being adjusted to be equivalent to that of the reference imaging sensor. For example, in an embodiment, the non-reference image may be scaled by a ratio based on the focal distance of the reference image and the focal distance of the non-reference image. Adjusting of the focal distance may also adjust the field of view of the image. The adjusted calibration matrix may then be stored to a memory or a data store. The adjusted calibration matrix may then be applied to additional image pairs captured by the asymmetric imaging sensors.

After the field of view of the non-reference image data has been adjusted to match the field of view of the reference image data, the non-referenced image data may be up-sampled and cropped to match the resolution and field of view of the reference image data.

In another implementation, different resolution sensors may require different timing considerations. It may be desirable to capture multiple images from sensors with differing resolutions at the same time. To ensure data captured from the sensors is captured at the same time, reading each of the sensors should be performed during a common set of clock cycles. Each of the multiple imaging sensors may also be controlled by a common clock. By controlling each of the multiple sensors with a common clock, and reading each of the sensors during the same clock cycles, some implementations may ensure that the data captured by each sensor is correlated in time with data captured by other sensors.

In some embodiments, the system may compensate for the different capture and download rates from each imaging sensor by synchronizing command data streams to the asymmetric imaging sensors with one another. For example, in implementations that utilize the I$^2$C serial computer bus protocol, commands may be sent to a controller of the asymmetric imaging sensors at different times. However, embodiments of the systems described herein include synchronization services that allow each imaging sensor to use the same I$^2$C timing signals to control data flow within the system and thus synchronize the execution of commands at each image sensor to deliver high quality stereoscopic images to a user.

In one implementation, an imaging device utilizing asymmetric imaging sensors may employ multiple I$^2$C SDA lines. For example, a first I$^2$C SDA data line may be used between a sensor controller and a first imaging sensor, and a second I$^2$C SDA data line may be provided between the controller and a second imaging sensor. An imaging application may send a command to capture a first image from the first imaging sensor to the sensor controller. Instead of immediately forwarding the command to the first imaging sensor, the controller may store the command. The imaging application may then send a second command, indicating a second image should be captured by the second imaging sensor. Once the controller has received commands for both imaging sensors, the controller may encode each command on a separate SDA line, with each SDA line connected to an imaging sensor. The imaging sensor controller may then use the same SCL line, which may be connected to the controller and both imaging sensors, to propagate each command to each imaging sensor. Since both imaging sensors receive their respective command at the same time via the same SCL, skew differences between the two imaging sensors are minimized.

In another implementation, a higher resolution imaging sensor may have a longer horizontal blanking time than a smaller resolution sensor. This longer horizontal blanking time result from a larger amount of data being produced by the higher resolution sensor. The larger amount of data may require more time to process. In implementations utilizing two imaging sensors with asymmetric resolutions, both imaging sensors may use the horizontal blanking time of the higher resolution sensor. In these implementations, the horizontal blanking time of the smaller resolution imaging sensor is extended, such that the number of horizontal pixels for both imaging sensors is equivalent. In some of these implementations, the vertical size of the two images may be made equivalent by cropping the higher resolution image to match the lower resolution image.

In addition, because asymmetric imaging sensors may provide a different color and brightness response, the system described herein may compensate for these differences by substantially equalizing the brightness and color response of the multiple imaging sensors. Some implementations may utilize a linear correction method to equalize the responses between the imaging sensors. In these implementations, each imaging sensor may be provided with independent offset and gain settings.

Other implementations may equalize the color response of two asymmetric sensors based on whether an implementation is utilizing one visual front end for its two imaging sensors, or if each imaging sensor has its own visual front end. Each asymmetric imaging sensor may have its own color response curves. Therefore, in implementations utilizing a single visual front end, the visual front end may switch between a first set of color response parameters when processing data from a first imaging sensor, and a second set of color response parameters when processing data from a second imaging sensor. In some embodiments, the image sensors may be calibrated prior to use so that they each produce images with similar brightness and color responses to captured scenes and in different lighting conditions.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIG. 1 is a block diagram showing one aspect of an imaging environment including a stereoscopic imaging device that includes two imaging sensors. The imaging device 100 is illustrated capturing a scene 130. Each imaging sensor of the camera includes a field of view, indicated by the dark lines 160a-d. The left imaging sensor 110 includes a field of view 140 bounded by lines 160a and 160c. The right imaging sensor 120 includes a field of view 150, which is bounded by lines 160b and 160d. As shown, the fields of view 140 and 150 overlap in area 170. The left imaging sensor's field of view 140 includes a portion of the scene not within the field of view of right imaging sensor 120. This is denoted as area 180. The right imaging sensor's field of view 150 includes a portion of the scene not within the field of view of imaging sensor 110. This is denoted as area 190. These differences in the field of view of the two imaging sensors 110 and 120 may be exaggerated for purposes of illustration.

The differences in the field of view of each imaging sensor 110 and 120 may create parallax between the images. FIG. 1 also shows a horizontal displacement 105 between the two imaging sensors 110 and 120. This horizontal displacement provides the parallax used in a stereoscopic image to create the perception of depth. While this displacement between the two imaging sensors may be an intentional part of the imaging device's design, other unintended displacements or misalignments between the two imaging sensors 110 and 120 may also be present.

Imaging sensor 110 and imaging sensor 120 may have different resolutions. For example, in some implementations, imaging sensor 110 may have a higher resolution than imaging sensor 120. Imaging sensors 110 and 120 may also have different field of views. For example, the area of the image imaged by imaging sensor 110's field of view 140 may be greater than the area of the image imaged by imaging sensor 120's field of view 150. Image processing methods may be employed within imaging device 100 to compensate for resolution and field of view differences between asymmetric imaging sensors 110 and 120.

Figure 2:
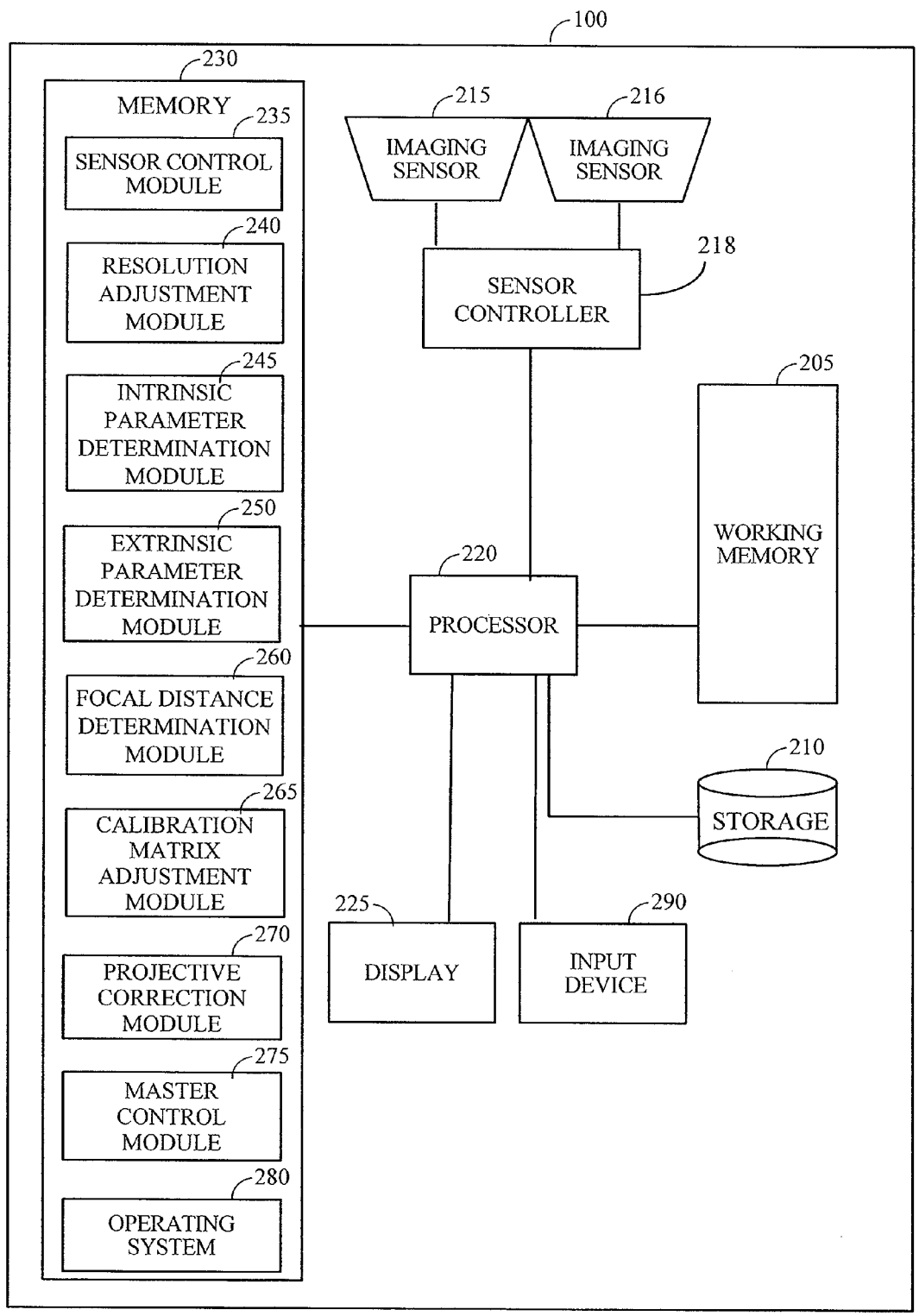
FIG. 2 is a block diagram of an imaging device implementing at least one operative embodiment of an image capture system.

FIG. 2 is a block diagram of an imaging device implementing at least one operative embodiment of an image capture system. The imaging device 100 includes a processor 220 operatively coupled to several components, including a memory 230, a sensor controller 218, a working memory 205, a storage 210, a display 225, and an input device 290. The sensor controller 218 is operatively coupled to a first image sensor 215, and a second image sensor 216. In some implementations, the resolution of the image sensor 215 may be greater than the resolution of the image sensor 216. In other implementations, the resolution of imaging sensor 216 may be higher than the resolution of imaging sensor 215.

The imaging device 100 may receive input via the input device 290. For example, the input device 290 may be comprised of one or more input keys included in the imaging device 100. These keys may control a user interface displayed on the electronic display 225. Alternatively, these keys may have dedicated functions that are not related to a user interface. For example, the input device 290 may include a shutter release key. The imaging device 100 may store images into the storage 210. These images may include stereoscopic image pairs captured by the imaging sensors 215 and 216. The working memory 205 may be used by the processor 220 to store dynamic run time data created during normal operation of the imaging device 100.

The memory 230 may be configured to store several software or firmware code modules. These modules contain instructions that configure the processor 220 to perform certain functions as described below. For example, an operating system module 280 includes instructions that configure the processor 220 to manage the hardware and software resources of the device 100. A sensor control module 235 includes instructions that configure the processor 220 to control the imaging sensors 215 and 216. For example, some instructions in the sensor control module 235 may configure the processor 220 to capture an image with imaging sensor 215 or imaging sensor 216. Therefore, instructions in the sensor control module 235 may represent one means for capturing an image with an image sensor. Other instructions in the sensor control module 235 may control settings of the image sensor 215. For example, the shutter speed, aperture, or image sensor sensitivity may be set by instructions in the sensor control module 235.

A resolution adjustment module 240 may configure processor 220 to adjust the resolution of one or more images captured by either imaging sensor 215 or imaging sensor 216. For example, in some implementations, instructions in the resolution adjustment module may "bin" an image captured by imaging sensor 215, such that a resulting image has an equivalent resolution as an image captured by imaging sensor 216. Instructions in the resolution adjustment module 240 may also up-sample an image captured by imaging sensor 215 or imaging sensor 216. For example, an image captured by an imaging sensor having a lower resolution may be up-sampled to match the resolution of an image captured by an imaging sensor with a higher resolution. Therefore, instructions in the resolution adjustment module may represent one means for adjusting the resolution of an image.

An intrinsic parameter determination module 245 includes instructions that determine intrinsic parameters of imaging sensors 215 and 216. For example, intrinsic parameter determination module 245 may analyze images captured by imaging sensor 215 and imaging sensor 216 to determine parameters such as the field of view of the imaging sensors. The resolution of each imaging sensor may also be determined by intrinsic parameter determination module 245. Therefore, instructions included in the intrinsic parameter determination module 245 may represent one means for determining intrinsic parameters of an imaging sensor.

An extrinsic parameter determination module 250 includes instructions that determine extrinsic parameters of imaging sensors 215 and 216. For example, parameters related to the pose or relative position of each imaging sensor may be determined by extrinsic parameter determination module 250. Relative offsets about an X, Y, or Z axis may be determined. Additionally, relative rotation about the X, Y, or Z axis between the two imaging sensors may be determined, such as offsets in yaw, pitch, or roll may be determined by instructions included in extrinsic parameter determination module 250. Therefore, instructions included in the extrinsic parameter determination module 245 may represent one means for determining extrinsic parameters of an imaging sensor.

A focal distance determination module may determine the focal distance of one or more images captured by imaging sensor 215 or imaging sensor 216. Therefore, instructions in the focal distance determination module may represent one means for determining the focal distance of an imaging sensor.

A calibration matrix adjustment module 265 may adjust a calibration matrix. The calibration matrix may be used to adjust images captured by imaging sensor 215 or imaging sensor 216 such that they are calibrated with images captured by the other imaging sensor. When two images are calibrated, they may represent viewpoints of a scene that differ only by parameters intended by the design of the imaging device 100. For example, imaging device 100 may be designed such that a pair of images captured by imaging sensor 215 and imaging sensor 216 should have a horizontal disparity of an average intraocular distance to support stereoscopic imaging. If imaging device is properly calibrated in this example implementation, no other differences between the two images should be present. For example, the images should exhibit no vertical disparity, which may be caused by vertical misalignments between the two imaging sensors. The images should also exhibit no misalignments caused by a relative rotation of an imaging sensor about an axis. For example, no misalignments in yaw, pitch, or roll should be present.

A projective correction module 270 includes instructions that configure the processor 220 to perform a projective correction on one or both images of a stereoscopic image pair. The projective correction may be based on the calibration matrix adjusted by instruction in calibration matrix adjustment module 265.

A master control module 275 includes instructions to control the overall functions of imaging device 100. For example, master control module 275 may invoke subroutines in sensor control module 235 to capture a stereoscopic image pair by first capturing a first image using imaging sensor 215 and then capturing a second image using imaging sensor 216. Some implementations may capture two images with the two imaging sensors at substantially the same moment in time. Master control module 275 may then invoke subroutines in the focal distance determination module 260 to determine a reference focal distance of an image. The master control module 275 may then invoke subroutines in the calibration matrix adjustment module 265 to adjust the calibration matrix based on the reference focal distance. The master control module 275 may then invoke subroutines in the projective correction module 270 to apply the calibration matrix to a non-reference image to adjust the focal distance of the first image and the second image to be equivalent.

The master control module 275 may also store calibration data such as a calibration matrix in a stable non-volatile storage such as storage 210. This calibration data may be used to adjust stereoscopic image pairs.

Figure 3:
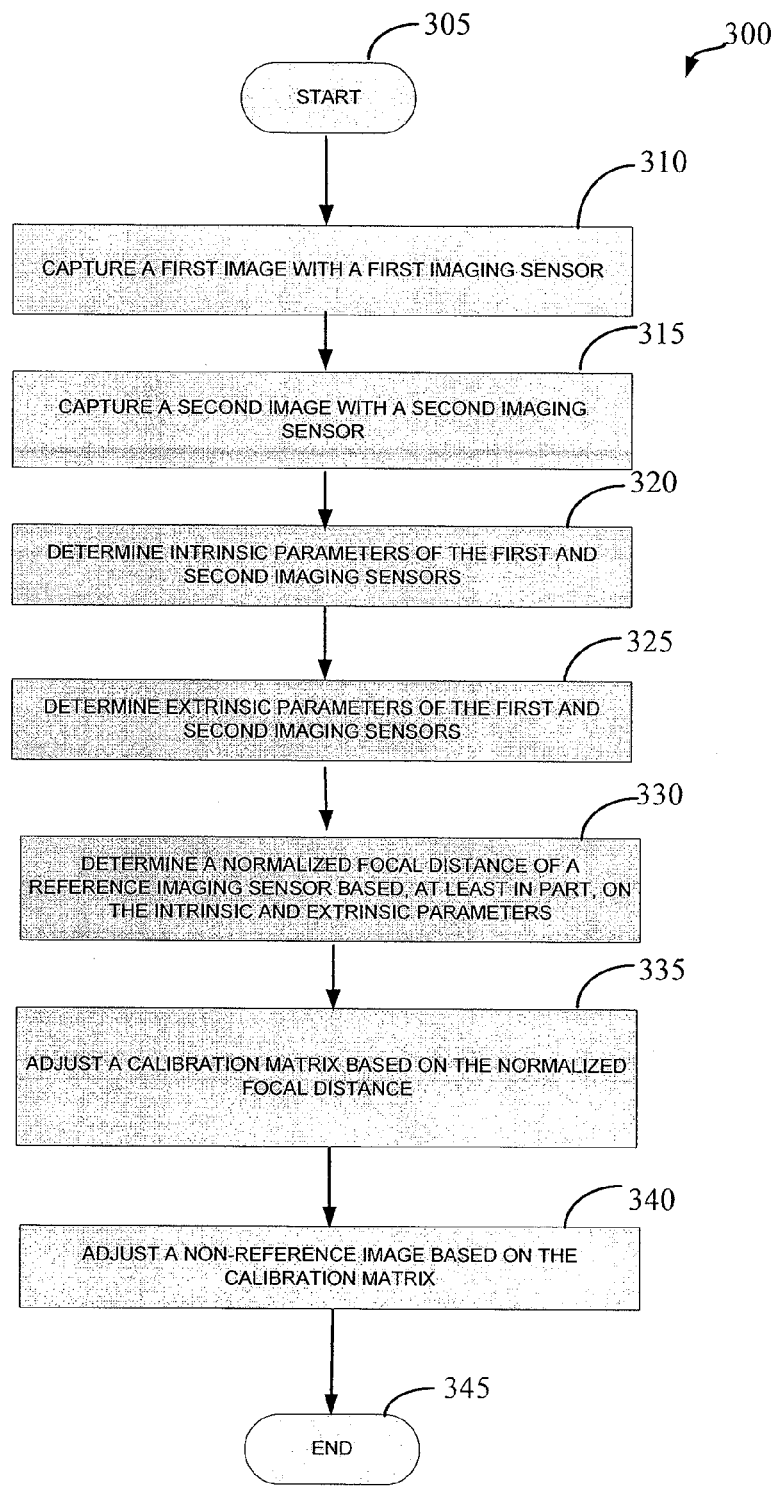
FIG. 3 is a flowchart of one embodiment of a process for adjusting a stereoscopic image pair.

FIG. 3 is a flowchart of one embodiment of a process for adjusting a stereoscopic image pair. Process 300 may be implemented by instructions included in one or more modules illustrated in device 100 of FIG. 2. Process 300 begins at start block 305 and then moves to processing block 310, where a first image is captured with a first imaging sensor. Process 300 then moves to processing block 315 where a second image is captured with a second imaging sensor. Processing block 310 and/or processing block 315 may be performed by instructions included in the sensor control module 235, illustrated in FIG. 2. In some implementations, the first imaging sensor may be a higher resolution than the second imaging sensor. In these implementations, the first image will also be a higher resolution than the second image.

Process 300 then moves to processing block 320, where intrinsic parameters are determined. Intrinsic parameters may include the resolution and field of view of the first imaging sensor and the second imaging sensor. Processing block 320 may be performed by instructions included in the intrinsic parameter determination module 245, illustrated in FIG. 2.

Process 300 then moves to processing block 325, where extrinsic parameters are determined. Extrinsic parameters may include parameters related to the relative position of the first imaging sensor when compared to the position of the second imaging sensor. For example, offsets relative to an X, Y, or Z axis may be determined in processing block 325. A relative rotation about the X (pitch), Y (yaw), or Z (roll) axis may also be determined in processing block 325. Processing block 325 may be performed by instructions included in the extrinsic parameter determination module 250, illustrated in FIG. 2.

Process 300 then moves to processing block 330, where a normalized focal distance of a reference imaging sensor at a given focal setting is determined. The reference imaging sensor may be the first imaging sensor or the second imaging sensor. The imaging sensor that is not the reference imaging sensor may be described as the non-reference imaging sensor. The normalized focal distance may be determined by analyzing the first image or the second image. To estimate the focal distance, three dimensional coordinates of keypoints may be compared to the coordinates of corresponding keypoints in its two dimensional image. The 3d and 2d coordinates may then be related by a matrix. In an embodiment, the matrix may be a 3×4 matrix. This matrix encapsulates the focal length. Processing block 330 may be performed by instructions included in the focal distance determination module 260, illustrated in FIG. 2.

Process 300 then moves to block 335, where a calibration matrix is adjusted based on the normalized focal distance determined in processing block 330. Processing block 335 may be performed by instructions included in the calibration matrix adjustment module 265, illustrated in FIG. 2.

Process 300 then moves to processing block 340, where a non-reference image is adjusted based on the calibration matrix. A non-reference image may be generated by the non-reference imaging sensor. For example, if the first imaging sensor is the reference imaging sensor, then the second imaging sensor may be the non-reference imaging sensor. In this example, the second image is the non-reference image. Processing block 340 may be performed by instructions included in the projective correction module 270, illustrated in FIG. 2. Process 300 then moves to end block 345.

Figure 4A:
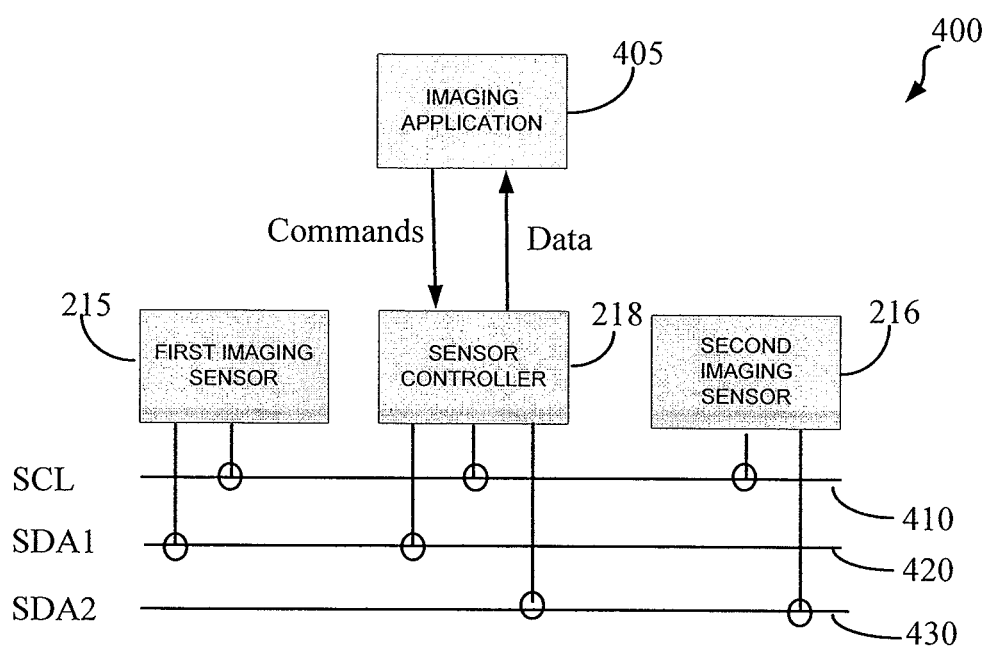
FIG. 4A is a block diagram of a sensor controller and a first and second imaging sensor.

FIG. 4A is a block diagram of a sensor controller and a first and second imaging sensor. As shown, imaging application 405 sends imaging commands to the sensor controller 218. Sensor controller 218 is in communication with the first imaging sensor 215 and second imaging sensor 216 via three communication lines 410, 420, and 430. In some implementations, imaging application 405 may send a command requesting sensor controller 218 to capture two images with the first imaging sensor 215 and the second imaging sensor 216. In an embodiment, the sensor controller 218 may have its own I2C address and its own configuration. The sensor controller 218 configuration (not shown) may be writable. For example, imaging application 405 may update the configuration of the sensor controller 218. Alternatively, another application, such as a system process (not shown) may update the configuration of the sensor controller 218. Imaging application 405 may also send commands to sensor controller 218 requesting it to read imaging data from the first imaging sensor 215 or the second imaging sensor 216.

The first imaging sensor 215 and the second imaging sensor 216 may be of a different design. For example, in some implementations, the resolution of the first imaging sensor 215 may be higher than the resolution of the second imaging sensor 216. The first imaging sensor and the second imaging sensor may also have different horizontal blanking times.

A first pair of communication lines (410, 420) provides communication between the sensor controller 218 and the first imaging sensor 215. A second pair of communication lines (410, 420) provides communication between the sensor controller 218 and the second imaging sensor 216. The first imaging sensor 215 and the second imaging sensor 216 use different SDA lines when communicating with the sensor controller 218. The first imaging sensor 215 uses a SDA1 line 420 to communicate with the sensor controller 218 while the second imaging sensor 216 uses a SDA2 line 430 when communicating with the sensor controller 218. Both the first imaging sensor 215 and the second imaging sensor 216 share the same "SCL" line 410 when communicating with the sensor controller 218. In some implementations, the first or second pair of communication lines may be used to implement the I²C protocol between the sensor controller and an imaging sensor.

With the illustrated communications architecture, the sensor controller 218 may send different commands to the first imaging sensor 215 and the second imaging sensor 216. The different commands may be sent using the different SDA lines SDA1 (420) and SDA2 (430). Since both the first imaging sensor 215 and the second imaging sensor 216 share the SCL line, the two commands can be communicated to the two imaging sensors at substantially the same time. This may reduce skew differences between the two sensors in some implementations.

FIG. 4B is a block diagram of a sensor controller. In an embodiment, the sensor controller 218 may be an I2C router. The sensor controller 218 may receive commands over an SCL line 480 and SDA line 482. For example, sensor controller 218 may receive commands from an imaging application such as imaging application 405 over SCL line 480 and SDA line(s) 482. The sensor controller 218 may then transmit and receive commands to at least two imaging sensors over SCL line 484, SDA1 line(s) 485 and SDA2 line(s) 486.

FIG. 4C is a timing diagram illustrating the sending of two commands to asymmetric imaging sensors using an embodiment of the disclosed I2C router. At time 465, a sensor controller command 490 is received by the sensor controller 218. The command 490 may have been sent over SCL line 480 and SDA line 482. In an embodiment, the command may indicate to the sensor controller 218 which commands should be sent to at least two imaging sensors. The sensor controller 218 may process the command upon receiving it. In response the sensor controller 218 may generate one or more commands using SCL line(s) 484, SDA1 line(s) 485 and SDA2 line(s) 486. Reception of the command 490 and its processing introduces a delay in the sending of commands to the at least two imaging sensors. This delay is represented by time 455. Sensor controller 218 then sends a command to a first imaging sensor 495 and a command to a second imaging sensor 498 during time periods 470 and 460 respectively. Note that because sensor controller 218 implements at least two SDA lines for controlling the at least two imaging sensors, the command to the first imaging sensor 495 and the command to the second imaging sensor 498 may be sent substantially in parallel. Because the command to the second imaging sensor 498 is longer than the command for the first imaging sensor 495, the SDA2 line is busy for a longer period than the SDA1 line, which is used to send the command to the first imaging sensor.

In the timing diagram of FIG. 4C, commands can be sent to each imaging sensor at the exact same time. In an embodiment, both commands may utilize the same clock line. In an embodiment, the synchronization of the cameras may be performed without closing loops. In an embodiment, an open loop system is utilized that has predictable behavior. In an embodiment, the program sequence is sent the same way each time sensors are started.

Figure 5:
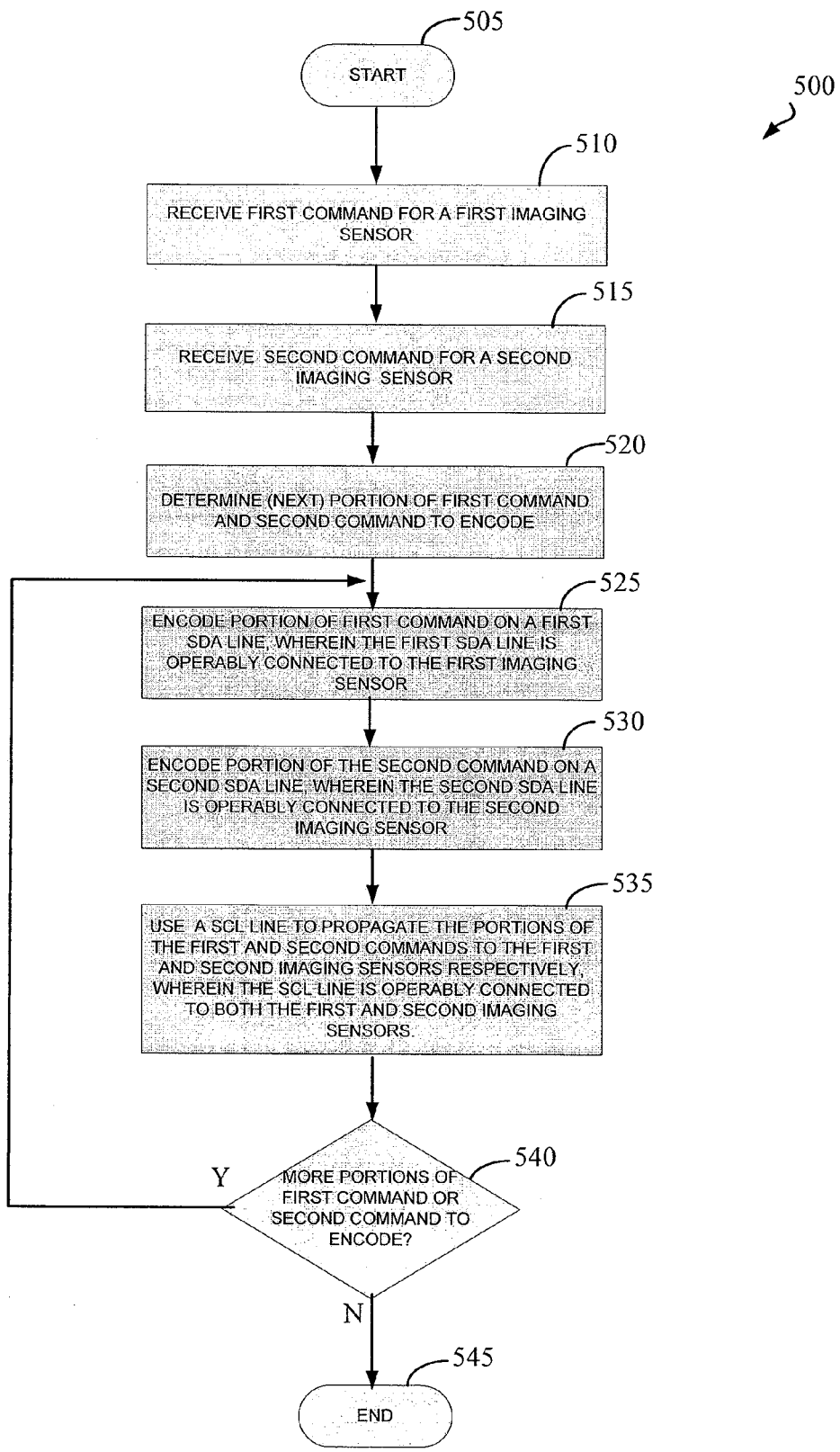
FIG. 5 is a flowchart illustrating one embodiment of a process of sending two different commands to two imaging sensors using a shared SCL line.

FIG. 5 is a flowchart illustrating one embodiment of a process of sending two different commands to two imaging sensors using a shared SCL line. Process 500 may be implemented by the sensor controller 218, illustrated in FIG. 2 and FIG. 4A. In some other implementations, process 500 may be implemented by the sensor control module 235, illustrated in FIG. 2. Process 500 begins at start block 505 and then moves to processing block 510, where a first command is received for a first imaging sensor. Process 500 then moves to processing block 515, where a second command is received for a second imaging sensor. Process 500 then moves to processing block 520, where a portion of the first command to encode and a portion of the second command to encode are determined. The portion determined for the first command or the portion determined for the second command may be null or empty. For example, if the command has been completely encoded by previous iterations of process 500 (see below), then no portion of a command may be identified for encoding in processing block 520.

Process 500 then moves to processing block 525, where the portion of the first command determined in processing block 520 is encoded on a first SDA line. The first SDA line may be operably connected to the first imaging sensor. Note that if the first command has been completely encoded by previous iterations of process 500 (see below), then no portion of the first command may be encoded in processing block 525 for some iterations.

Process 500 then moves to processing block 530, where the portion of the second command determined in processing block 520 is encoded on a second SDA line. The second SDA line may be operably connected to the second imaging sensor. Note that if the second command has been completely encoded by previous iterations of process 500 (see below), no portion of the second command may be encoded in processing block 530 for some iterations.

Process 500 then moves to processing block 535, where an SCL line is used to propagate the portions of the first and second commands to the first and second imaging sensors, respectively. The SCL line may be operably connected to both the first and second imaging sensors. Process 500 then moves to decision block 540, where it is determined if there are more portions of either the first command or the second command to encode. If portions remain un-encoded, process 500 returns to processing block 525, and process 500 repeats. If all portions of both the first and second commands have been encoded previously, process 500 moves to end block 545 and terminates.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

We claim:

1. A method of calibrating a stereoscopic imaging device, comprising:
    capturing a first image of a scene of interest with a first image sensor having a first resolution, a first set of intrinsic parameters and a first set of extrinsic parameters;
    capturing a second image of the scene of interest with a second image sensor having a second resolution different from the first resolution, wherein the second image sensor comprises a second set of intrinsic parameters and a second set of extrinsic parameters, and wherein the first image and second image comprise a stereoscopic image pair;
    determining a normalized focal distance of the first image sensor, based, at least in part, on the intrinsic and extrinsic parameters of the first sensor;
    adjusting a calibration matrix based on the normalized focal distance; and
    storing the calibration matrix in the stereoscopic imaging device.

2. The method of claim 1, wherein the calibration matrix is updated by capturing an image with the second image sensor and determining an adjustment so that the focal distance of the second image sensor is equivalent to the focal distance of the first image sensor, and wherein the adjustment is stored in the calibration matrix.

3. The method of claim 1, wherein the first set of intrinsic parameters or the second set of intrinsic parameters include a resolution and field of view.

4. The method of claim 1, wherein the first set of extrinsic parameters or second set of extrinsic parameters include camera pose parameters.

5. The method of claim 4, wherein the camera pose parameters include yaw, pitch, and roll offsets between the first image sensor and the second image sensor.

6. The method of claim 1, wherein the resolution of the first image sensor is greater than the resolution of the second image sensor.

7. The method of claim 1, wherein determining a normalized focal distance comprises determining a set of keypoints in a first image captured by the first image sensor.

8. An apparatus for calibrating a stereoscopic image pair, comprising:
    a first image sensor with a first resolution, first intrinsic parameter and a first extrinsic parameter;
    a second image sensor, with a second resolution different than the first resolution, wherein the second image sensor has a second intrinsic parameter and a second extrinsic parameter;
    a sensor controller, operatively coupled to the first image sensor and the second image sensor;
    a processor;
    a memory, operatively coupled to the processor, and storing:
        a sensor control module, configured to capture a first image of a scene of interest with the first image sensor, and to capture a second image of the scene of interest with the second image sensor, wherein the first image and second images comprise a stereoscopic image pair, a focal distance determination module, configured to determine a normalized focal distance of the first image sensor, based, at least in part, on the first intrinsic and extrinsic parameters, and a calibration matrix adjustment module, configured to store a calibration matrix based on the normalized focal distance in the apparatus.

9. The apparatus of claim 8, further comprising a projective correction module, configured to adjust a second image captured by the second image sensor based on the calibration matrix.

10. The apparatus of claim 8, wherein the intrinsic parameters include a resolution and field of view.

11. The apparatus of claim 8, wherein the extrinsic parameters include camera pose parameters.

12. The apparatus of claim 11, wherein the camera pose parameters include yaw, pitch, and roll offsets between the first image sensor and the second image sensor.

13. The apparatus of claim 8, wherein the resolution of the first image sensor is greater than the resolution of the second image sensor.

14. The apparatus of claim 8, wherein the focus distance determination module is configured to determine a set of keypoints in a first image captured by the first image sensor.

15. An apparatus for capturing a stereoscopic image pair, comprising:

means for capturing a first image of a scene of interest with a first image sensor having a first resolution, a first set of intrinsic parameters and a first set of extrinsic parameters;

means for capturing a second image of the scene of interest with a second image sensor having a second resolution different from the first resolution, wherein the second image sensor comprises a second set of intrinsic parameters and a second set of extrinsic parameters, and wherein the first image and second image comprise a stereoscopic image pair;

means for determining a normalized focal distance of the first image sensor, based, at least in part, on the intrinsic and extrinsic parameters of the first sensor;

means for adjusting a calibration matrix based on the normalized focal distance; and means for storing the calibration matrix in the stereoscopic imaging device.

16. The apparatus of claim 15, wherein the intrinsic parameters include a resolution and field of view.

17. The apparatus of claim 16, wherein the extrinsic parameters include camera pose parameters.

18. The apparatus of claim 17, wherein the camera pose parameters include yaw, pitch, and roll offsets between the first image sensor and the second image sensor.

19. A non-transitory computer readable medium storing processor instructions that when executed cause a processor to perform the method of:

capturing a first image of a scene of interest with a first image sensor having a first resolution, a first set of intrinsic parameters and a first set of extrinsic parameters;

capturing a second image of the scene of interest with a second image sensor having a second resolution different from the first resolution, wherein the second image sensor comprises a second set of intrinsic parameters and a second set of extrinsic parameters, and wherein the first image and second image comprise a stereoscopic image pair;

determining a normalized focal distance of the first image sensor, based, at least in part, on the intrinsic and extrinsic parameters of the first sensor;

adjusting a calibration matrix based on the normalized focal distance; and storing the calibration matrix in the stereoscopic imaging device.

20. The computer readable medium of claim 19, wherein the intrinsic parameters include a resolution and field of view.

21. The computer readable medium of claim 19, wherein the extrinsic parameters include camera pose parameters.

22. The computer readable medium of claim 21, wherein the camera pose parameters include yaw, pitch, and roll offsets between the first image sensor and the second image sensor.

23. The computer readable medium of claim 19, wherein the first image sensor has a greater resolution than the second image sensor.

24. The method of claim 1, further comprising adjusting a focal distance of a third image captured by the second imaging sensor by performing a projective correction on the third image using the calibration matrix.

* * * * *